July 5, 1960

F. W. RENWICK, SR 2,943,662

ANTISKID DEVICE

Filed April 25, 1957

INVENTOR.
FREDERICK W. RENWICK, SR.
BY John H Robertson
ATTORNEY.

July 5, 1960 F. W. RENWICK, SR 2,943,662
ANTISKID DEVICE
Filed April 25, 1957 2 Sheets-Sheet 2
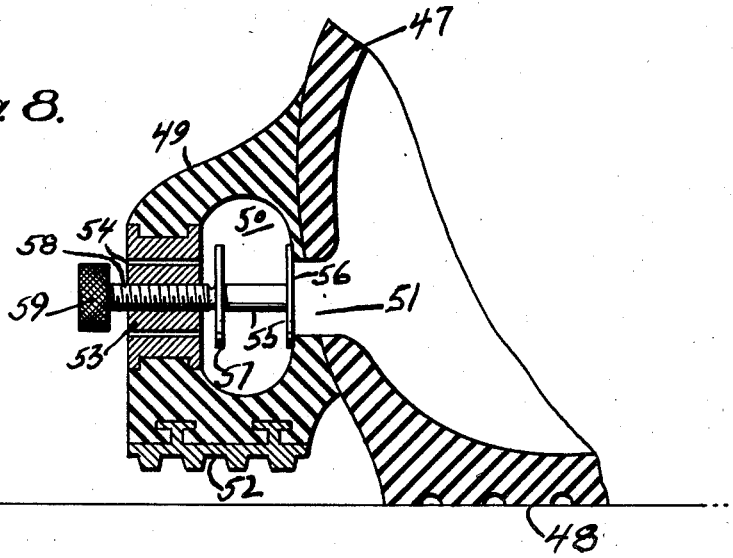
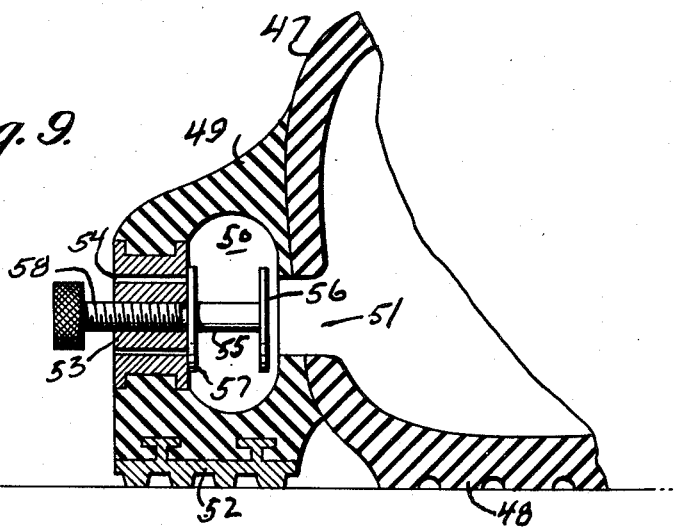
INVENTOR.
FREDERICK W. RENWICK, SR
BY
ATTORNEY.

United States Patent Office 2,943,662
Patented July 5, 1960

2,943,662

ANTISKID DEVICE

Frederick W. Renwick, Sr., 156 S. Poplar Ave.,
Maple Shade, N.J.

Filed Apr. 25, 1957, Ser. No. 655,135

3 Claims. (Cl. 152—208)

The present invention relates to antiskid devices for motor vehicles and is concerned primarily with a device that is capable of being rendered effective with a minimum effort on the part of the driver.

At the present time, the automotive industry is safety conscious. Much of the efforts of present-day automotive engineering is directed to the end of achieving increased safety. One of the most important factors of safe driving is the control or elimination of skidding; and, over the years, many different types of antiskid devices have been provided.

It may be stated as a general rule that just about all of the antiskid devices heretofore provided and now available require considerable effort and manipulation in putting them on the tires into effective position and removing them therefrom. This is true whether the antiskid devices are provided solely for the elimination of skidding as well as for providing improved traction.

With the foregoing conditions in mind, the present invention has in view as its foremost objective the provision of an antiskid device that is adapted to be applied to a wheel or rim carrying a conventional pneumatic tire, but which under ordinary conditions is ineffective. It is rendered effective and brought into use by the simple operation of deflating the tire to a predetermined degree.

In carrying out this idea, one or two ringlike members having antiskid or traction surfaces on their peripheral edges are mounted on one or both sides of the wheel carrying the tire. The diameter of the antiskid surfaces is somewhat less than that of the tire when inflated to the degree required for normal driving. When a condition arises which requires the use of the antiskid devices, the driver of the car simply deflates the tire to the extent necessary to bring the antiskid surfaces into engagement with the road surfaces.

An antiskid device of the character aforesaid presents the further advantage of providing an adequate support for the tire and wheel in case of a blowout, and enables the driver to reach a service station without injury to the tire. Moreover, it constitutes a telltale advising the driver of the fact that a tire has become dangerously deflated.

After the conditions requiring the use of the antiskid device have ceased to exist, all the driver has to do is to drive into a service station and restore the tires to the normal degree of inflation.

From the foregoing, it is apparent that it is highly important that the tires be deflated accurately to a predetermined degree so that part of the weight of the car will be borne by the partially deflated tires and part by the antiskid surfaces. It is another important object to provide a valve assembly that is adapted to be attached to the conventional valve stem of a tire and which may be operated when occasion demands to deflate the tire to a required degree.

Still another object of the invention is to provide a modified form of antiskid attachment in which a series of antiskid members are anchored directly to the tire on the opposite sides thereof just within the tread surface.

Yet another object in view is to provide a modification in which a pneumatic tire is provided with an auxiliary tube on one side thereof and in communication with the tire. This tube has an antiskid surface that normally lies within the tread surface of the tire and out of engagement with the road surface. This condition obtains when communication between the tire and tube is cut off and the tube is deflated. However, when communication between the tire and tube is established, the tire is partially deflated and the tube inflated to bring the antiskid surface on the latter into substantial alignment with the tread surface of the tire and engagement with the road surface.

Various other more detailed objects and advantages of the invention, such as arise in connection with carrying out the above-noted ideas in a practical embodiment, will in part become apparent and in part be hereinafter stated as the description of the invention proceeds.

The invention therefore comprises an antiskid device for motor-vehicle tires which consists essentially of a pair of ringlike members having antiskid surfaces defined by a diameter slightly less than the tire to which it is to be applied when the said tire is inflated, together with a valve assembly adapted to be attached to the valve stem of the tire for controlling the degree of deflation thereof.

For a full and more complete understanding of the invention, reference may be had to the following description and accompanying drawings, wherein:

Figure 8 is a section through a part of a tire depicting a second modification with the antiskid device ineffective; and Figure 9 is a view similar to Figure 8 illustrating the relative condition of the parts when the antiskid device is effective.

Figure 1:
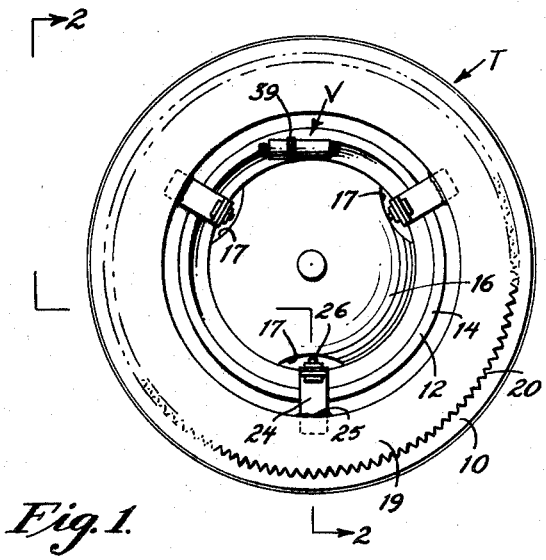
Figure 1 is a view in side elevation of a wheel carrying a pneumatic tire with the antiskid device of this invention applied thereto.
Figure 2:
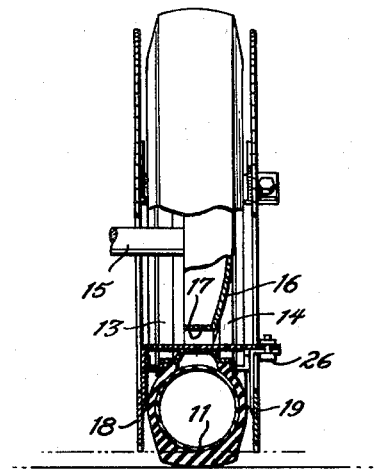
Figure 2 is a view partly in section and partly in elevation with the tire broken away, and is taken about on the plane represented by the lines 2—2 of Figure 1.
Figure 5:
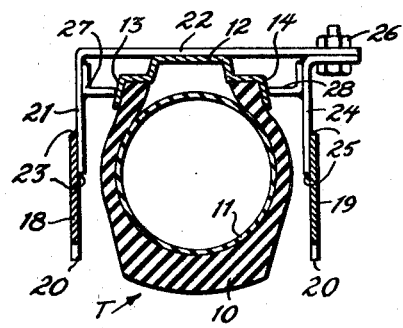
Figure 5 is a section taken on an enlarged scale through the tire-rim attachment.

Referring now to the drawing, wherein like reference characters denote corresponding parts, and first more particularly to Figures 2 and 5, a conventional pneumatic tire is referred to in its entirety by the reference character T and is shown as including a tire casing 10 and an inner tube 11. The tire T is mounted on a rim 12, the latter being of conventional construction including outer side flanges 13 and 14.

In accordance with present-day automotive design, it is common practice to support the rim 11 from an axle or shaft 15 by structure (not illustrated) which is covered by a plate or disc 16. This plate or disc 16 is ordinarily formed with three recesses 17. This invention takes advantage of the presence of these recesses in anchoring the antiskid devices now to be described to the wheel assembly.

A pair of ringlike members 18 and 19 are formed with antiskid or traction surfaces at 20 on their outer peripheral edges. The diameter of these surfaces 20 is somewhat less than that of the tire T when the latter is inflated. As is clearly shown in Figure 5, an L-shaped bracket member made up of a radial arm 21 and a cross arm 22 is attached to the ring 18 with the arm 21 being secured thereto as by the welding shown at 23. The cross arm 22 extends through one of the recesses 17; and, at its outer end has secured thereto a second radial arm 24 which is attached to the ring 19, as by the welding shown at 25. The nut-and-bolt assembly shown at 26 is employed to secure the radial arm 24 to the cross arm 22.

The L-shaped bracket made up of the arms 21 and 22 carries an L-shaped spacing lug 27 the free edge of which engages the flange 13 on the rim 12. Another similar L-shaped lug 28 that is carried by the arm 24 has a free edge engaging the flange 14. Thus these lugs 27 and 28 serve to accurately position the rings 18 and 19 with respect to the wheel assembly and particularly the tire T.

Figure 3:
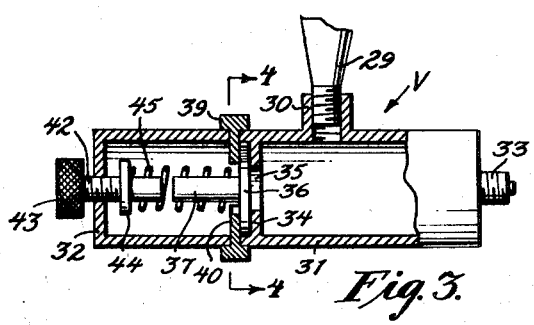
Figure 3 is a detailed section taken on an enlarged scale through the valve assembly.
Figure 4:
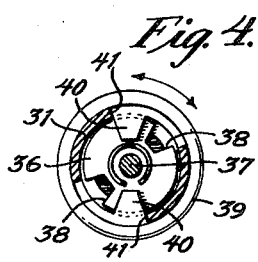
Figure 4 is a detailed section through the valve assembly taken normal to the showing of Figure 3 and about on the plane represented by the line 4—4 of Figure 3.

Referring now more particularly to Figure 3, the conventional valve stem or connection to the inner tube 11 is shown at 29. The conventional valve mechanism now included in the inner tube is replaced by a valve assembly that is referred to in its entirety by the reference character V and which includes an internally threaded nipple 30 that is threaded onto the valve-stem connection 29.

The valve assembly V includes a cylindrical casing 31 having a head 32 at one end, with the other end being closed by a similar head that carries a conventional tube valve shown at 33. Midway between its two ends, the casing 31 is formed with an inwardly extending annular ring 34 constituting a valve seat and defining a valve opening 35.

Cooperating with the valve-seat ring 34 and the opening 35 is a valve member 36 in the form of a disc having a diameter comparable to the inner bore of the casing 31. The disc 36 carries a stem 37 and is formed with a pair of diametrically opposed recesses 38 which extend from the peripheral edge inwardly to a distance less than the opening 35 in the ring 34. An operating ring 39, which preferably has a knurled surface to facilitate its operation, is mounted about the casing 31 for limited rotative movement relative thereto and is formed with a pair of inwardly extending projections 40 which are adapted to align with the recesses 38, but which in ordinary position overlie the disc 36 to hold the latter in sealing position against the seat ring 34. These projections extend through arcuate slots 41 formed on the casing 31.

A screw stem 42 is threadedly mounted in the head 32 and carries a knurled operating member 43. The stem 42 projects into the casing and carries a spring abutment 44 therewithin. An expansion coil spring 45 is disposed about the stem 42 at one end and engages the abutment 44, and at its other end is disposed about the stem 37 and engages the valve disc 36. It is evident that the effective tension of this spring 45 may be adjusted by rotating the nut 43.

It is further evident that the valve at 33 may be employed in the usual way to inflate the tube 11 of the tire T to its normal degree of inflation, which will be maintained as long as projections 40 on the ring 39 are out of alignment with the recesses 38 and in engagement with the valve disc 36 to hold the latter in seated or closed position on the ring 34.

However, when the ring 39 is rotated to bring the projections 40 into alignment with the recesses 38, air pressure within the casing 31 will move the valve disc 36 against the influence of the spring 45 so as to unseat the disc and open the valve opening 36 and permit air to escape until the spring 45 is effective to again move the valve disc into closed position. Thus, the tension on the spring 45 determines the extent to which the tire will be deflated.

*Operation*

While the manner of using the claimed antiskid device and its mode of operation are believed to be obvious from the illustrations of the drawing and description of parts given, they may be briefly outlined as follows:

The rings 18 and 19 are applied on opposite sides of the tire T by passing the cross arms 22 through the recesses 17 and anchoring the arms 24 to the outer ends of the arms 22 by the bolts 26. Moreover, the tire T is inflated to the normal extent by introducing air under pressure at the valve 33. In its normally inflated condition, the antiskid or traction surfaces 20 are spaced from the road surface as shown in Figure 2; and under ordinary driving conditions are ineffective.

Should the driver be confronted with a condition requiring the use of the antiskid or traction surfaces 20, he simply rotates the ring 39 to the maximum possible extent permitted by the slots 41. This brings the projections 40 into alignment with the recesses 38; whereupon air escapes to the extent permitted by the tension of the spring 45. The tension of the spring will be adjusted by the nut 43 so that the valve disc 36 will close when a desired degree of deflation has been achieved. This deflation will bring the traction or antiskid surfaces 20 into engagement with the road surface at the same time that the tread surface of the tire engages the road.

There may be occasions when it will be desirable to deflate the valve at night or when visibility is obscured; and, to advise the operator of the fact that the tire is being deflated, the escaping air may operate an audible signal such as a whistle (not illustrated).

When it is desired to render the antiskid devices ineffective, the operator simply drives to a service station, returns the ring 39 to its original position in which the projections 40 hold the disc 36 against the ring 34; whereupon air under pressure is again introduced through the valve 33 to restore the tire to its normal degree of inflation.

*First modification*

Figure 6:
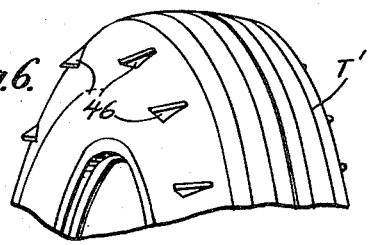
Figure 6 is a perspective view of a modification.
Figure 7:
Figure 7 is a detail section through the tire of Figure 6 when partially deflated.

A slightly modified form of the invention is disclosed in Figure 6. In this form the tire T' is shown as carrying a plurality of antiskid elements 46. Each of these elements 46 has an antiskid or traction surface which normally is ineffective when the tire T' is fully inflated. However, when the tire is deflated, as shown in Figure 7, the antiskid surfaces of the elements 46 engage the road to achieve the desired effects.

*Second modification*

Referring now more particularly to Figures 8 and 9, a second modification will be described.

The casing of a tubeless tire is represented at 47. This casing has a tread surface 48. Molded into a side of the casing 47 is an annular tube 49 defining an air chamber 50. The latter communicates with the interior of the casing 47 by way of the opening 51. The annular edge of this opening 51 within the tube 49 constitutes a valve seat as will be later described.

The tube 49 has a tread surface in which is embedded a plurality of antiskid members 52. This tread surface normally lies within the tread surface 48 when the casing 47 is inflated to a normal degree and the tube 49 deflated. That is, as shown in Figure 8 the antiskid members 52 are normally out of engagement with the road surface.

Molded in the outer wall of the tube 49 is a metal bushing 53. The latter has a threaded bore and one or more air passages 54. A valve stem 55 carries a valve disc 56 designed to cooperate with the valve seat about the opening 51 and a second valve disc 57 that is adapted to close the air passages 54. The valve stem 55 has a threaded portion 58 that is screwed into the threaded bore of the bushing 53 and carries an operating member 59 on its outer end.

It is evident that with the disc 56 closing the opening 51 communication between the interior of casing 47 and tube 49 is cut off. Moreover, with the stem 55 adjusted to move the disc 56 into this closing position, the air passages 54 are open. Thus the casing 47 is fully inflated to its normal degree and the tube 49 is deflated. In this condition the antiskid members 52 are ineffective as they are out of engagement with the road surface.

When occasion arises that the antiskid members are needed, the operator merely unscrews the stem 55 by using the operating member 59. This action opens the opening 51 and is continued until the disc 57 closes the air passages 54. Air now passes from the interior of the casing 47 into the chamber 50 until the pressure in the two is equalized. This partially deflates the casing 47 and inflates the tube 49 to bring the tread surface 48 and antiskid members 52 into substantial alignment and engagement with the road surface as shown in Figure 9.

When the antiskid device is no longer needed, the screw stem is simply returned to the position of Figure 8. This opens the air passages 54 and deflates the tube 49. The operator may then drive into a service station and restore the casing 47 to its normal degree of inflation.

While preferred specific embodiments of the invention are hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a tire having an antiskid device built thereinto, a main casing defining an air chamber and having a tread surface and a side wall, an auxiliary tube molded into said side wall and having an air chamber, said casing and tube being formed with an opening communicating between said air chambers, said tube having a tread surface provided with antiskid members and which tread surface normally lies within the tread surface of said casing when said tube is deflated, said tube being formed with air passages, and a valve assembly normally restricting communication between said air chambers and having said air passages open but which may be adjusted to establish communication between said air chambers and close said air passages whereby said casing is partially deflated and said tube inflated to render said antiskid members effective.

2. In a tire having an antiskid device built thereinto, a main casing defining an air chamber and having a tread surface and a side wall, an auxiliary tube molded into said side wall and having an air chamber, said casing and tube being formed with an opening communicating between said air chambers, said tube having a tread surface provided with antiskid members and which tread surface normally lies within the tread surface of said casing when said tube is deflated, a bushing embedded in a wall of said tube and having a threaded bore and an air passage, a valve stem screwed into said bore, a valve member on said stem cooperating with said opening and a second valve member cooperating with said air passage.

3. In a tire having an antiskid device built thereinto, a main casing defining an air chamber and having a tread surface and a side wall, an auxiliary tube molded into said side wall and having an air chamber, said casing and tube being formed with an opening communicating between said air chambers, said tube having a tread surface provided with antiskid members and which tread surface normally lies within the tread surface of said casing when said tube is deflated, a bushing embedded in a wall of said tube and having a threaded bore and air passages, a valve stem having a threaded portion screwed into said threaded bore, an operating member on one end of said valve stem, a valve disc on the other end of said stem cooperating with said opening, and a second valve disc on said stem cooperating with said air passages.

References Cited in the file of this patent

UNITED STATES PATENTS

| | | |
|---|---|---|
| 1,225,084 | Von Sick | May 8, 1917 |
| 1,355,230 | Kaiser | Oct. 12, 1920 |
| 2,217,122 | Lowry | Oct. 8, 1940 |
| 2,235,375 | Kraft | Mar. 18, 1941 |
| 2,354,444 | Lyon | July 25, 1944 |
| 2,614,890 | Verderosa | Oct. 21, 1952 |
| 2,672,908 | Donegan | Mar. 23, 1954 |
| 2,708,470 | Gramelspacher | May 17, 1955 |
| 2,819,750 | Langdon | Jan. 14, 1958 |
| 2,841,199 | Voelkel et al. | July 1, 1958 |